(12) United States Patent
Ren et al.

(10) Patent No.: US 8,102,680 B2
(45) Date of Patent: Jan. 24, 2012

(54) SMART DRIVING METHOD FOR SYNCHRONOUS RECTIFIER AND ITS APPARATUS THEREOF

(75) Inventors: Yuancheng Ren, Hangzhou (CN); Junming Zhang, Hangzhou (CN); Lei Miao, Hangzhou (CN); Zhaoqi Mao, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 337 days.

(21) Appl. No.: 12/429,099

(22) Filed: Apr. 23, 2009

(65) Prior Publication Data

US 2009/0273951 A1 Nov. 5, 2009

(30) Foreign Application Priority Data

Apr. 30, 2008 (CN) .......................... 2008 1 0096214

(51) Int. Cl.
*H02M 3/335* (2006.01)
(52) U.S. Cl. .................. 363/21.14; 363/21.06
(58) Field of Classification Search ............... 363/21.06, 363/21.11, 21.12, 21.14, 21.18, 127
See application file for complete search history.

(56) References Cited

U.S. PATENT DOCUMENTS

| | | | |
|---|---|---|---|
| 6,995,991 B1 * | 2/2006 | Yang et al. | 363/21.14 |
| 2009/0003019 A1 * | 1/2009 | Yang | 363/21.06 |
| 2009/0109711 A1 * | 4/2009 | Hsu | 363/21.14 |
| 2009/0268494 A1 * | 10/2009 | Hu | 363/89 |

* cited by examiner

*Primary Examiner* — Adolf Berhane
*Assistant Examiner* — Emily Pham
(74) *Attorney, Agent, or Firm* — Perkins Coie LLP

(57) ABSTRACT

The present invention discloses a smart driving method for a secondary synchronous rectifier of an isolated converter and its apparatus thereof. The apparatus comprises: a main circuit having a secondary synchronous rectifier Q1; a differentiation filter circuit, filtering the drain-source voltage Vds of the secondary synchronous rectifier, comprising a capacitor and at least one resistor connected in series and outputting a filtered voltage Vf from either between said capacitor and said at least one resistor or between said at least one resistor; a smart driver, receiving Vf and Vds and putting out a driving signal to the gate of the secondary synchronous rectifier. The control approach is fulfilled by comparing Vds to a reference voltage Vthr2 and comparing the absolute value of Vf to another reference voltage Vthr3. When Vds<Vthr2 and |Vf|>Vthr3, Q1 is turned on. When Vds>Vthr1, Q1 is turned off, where Vthr1 is a predetermined reference voltage. The driving is reliable with an additional differentiation filter circuit to eliminate error trigger.

25 Claims, 13 Drawing Sheets

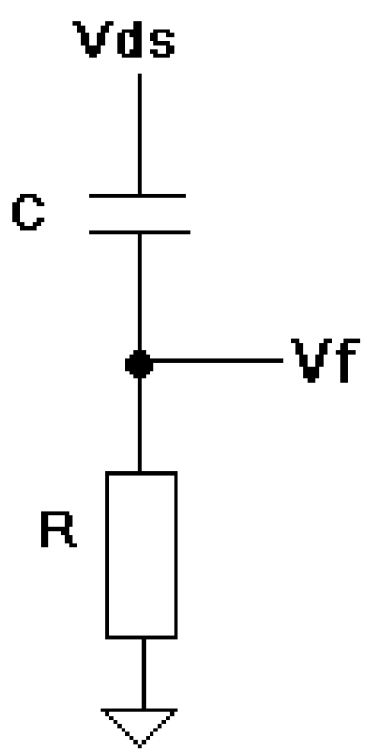
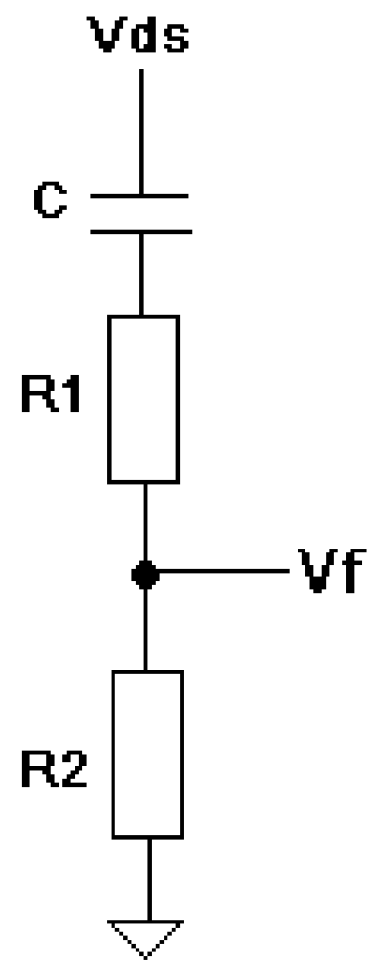
*FIG. 5A*  *FIG. 5B*

SMART DRIVING METHOD FOR SYNCHRONOUS RECTIFIER AND ITS APPARATUS THEREOF

CROSS-REFERENCE TO RELATED APPLICATIONS

This application claims the benefit of Chinese Patent Application No. 200810096214.8, filed on Apr. 30, 2008, which is incorporated herein by reference in its entirety.

TECHNICAL FIELD

The present invention relates to an improved driving scheme for a synchronous rectifier.

BACKGROUND

Generally speaking, two types of rectifying schemes may be used in the secondary side of a flyback converter: (1) non-synchronous rectifying which requires a diode (FIG. 1A) and (2) synchronous rectifying which rectifies the current through controlling on/off of a synchronous rectifier, e.g. an N-MOSFET (FIG. 1B). The voltage-current characteristic is plotted in FIG. 1C, for a diode (curve 12) and a synchronous rectifier (curve 11). In practical applications, the work area of a low power flyback power converter always falls into the shadowed area. The resistance of a synchronous rectifier is less than that of a diode in the area because curve 11 is always above curve 12. So, compared with using a diode, a scheme that uses a synchronous rectifier is more preferable because of less power waste and better efficiency. Synchronous rectifiers have thus found increasingly wide applications in devices sensitive to power efficiency, such as laptop adapters, wireless equipment, LCD power management modules and so on.

There are two methods for driving a synchronous rectifier. One method controls on/off of the synchronous rectifier based on the switching signal of the primary side switch. The drawback of this method is high cost for its relatively complicated structure. Furthermore, when light load or no load occurs, the control result is not always reliable.

A better method is independent on the primary side switching signal, but instead utilizes the characteristic of the body diode in a MOSFET. The method simulates the working function of a Schottky Diode, where the MOSFET will be turned on at forward-biased voltage and turned off at reversed-biased voltage. FIG. 2A shows a flyback power converter with a secondary synchronous rectifier Q1, arranged in the low side of the converter, with its source terminal connected to the ground terminal. FIG. 2B shows the waveform of Vds, the drain to source voltage of Q1. Vthr1 and Vthr2 are threshold voltages predetermined both lower than 0V and Vthr2 is lower than Vthr1 but higher than −Vcon, and Vcon is the voltage across body diode of Q1. Signal Vg drives gate of Q1 to turn it on when Vds is lower than Vthr2 and turn it off when Vds is higher than Vthr1.

When rectifier Q1 is off, switch A turns on with a direct current voltage Vin applied on the primary side of transformer T1, which inducts a voltage on the secondary side of T1 and makes body diode of Q1 reversed-biased. Vds can be given by Vds=(N2/N1)*Vin+Vout, here N1 and N2 standing for the winding turns of the primary and secondary side of T1 respectively. At time t=t1, switch A is cut off, leading to a reversed voltage induced across the secondary side of T1, so energy can be supplied to load through the forward-biased body diode of Q1. Forward-biasing of body diode makes Vds drop to a lower level equal to −Vcon, which is lower than Vthr2, so a driving signal is applied to gate of Q1 and turns it on. When Q1 enters into the equilibrium state, Vds can be expressed as Vds=−Rdson*I, in which I is source-drain current of Q1 and Rdson is the on-resistance of Q1. With the source-drain current decays, Vds rises gradually. At time t=t2, Vds rises to higher than Vthr1, which turns Q1 off. With the repetition of switching of switch A, the whole process repeats.

The drawback of this method is that it may cause false triggers under some conditions. Referring to FIG. 2B, after the time t1 when Q1 is turned on, there is a short period during which Vds fluctuates rapidly. If Vds rises to a value higher than Vthr1 as point A in FIG. 2B, Q1 will be turned off falsely. And after time t2 when Q1 is turned off, if body diode of Q1 is turned on again for the residual current, Vds may drop to a value lower than Vthr2 as point B in FIG. 2B, Q1 will be turned on falsely.

SUMMARY

A smart driving apparatus for a synchronous rectifier is disclosed. The main circuit has a synchronous rectifier, a differentiation filter circuit which receives drain-source voltage of the synchronous rectifier and outputs a differentiation signal, a smart driver which receives voltage on the drain terminal of said rectifier, voltage on the source terminal of said rectifier and the output signal of said differentiation filter circuit to control on/off of the rectifier.

In one embodiment, the rectifier will not be turned on until the drain-source voltage of the rectifier is lower than Vthr2 and the output signal of said differentiation filter circuit is lower than Vthr3. With this approach, false turning on of the rectifier shortly after turn-off can be avoided. The condition for turning off the rectifier is that the drain-source voltage of the rectifier is higher than Vthr1. To avoid false turning off of the rectifier shortly after being turned on further, the condition for turning off the rectifier is that the drain-source voltage of the rectifier is higher than Vthr1 and the output signal of the differentiation filter circuit is higher than Vthr4, where Vthr4 equals to Vthr3.

In one embodiment, a differentiation filter circuit comprises a capacitor and at least one resistor connected in series, one end of the capacitor receiving the drain-source voltage and the other end of the capacitor connected to one end of the at least one resistor, the other end of the at least one resistor connected to the source terminal of the rectifier. The output signal of the differentiation filter circuit can be derived from node either between the capacitor and the at least one resistor or between the at least one resistor. By adjusting value of at least one resistor and/or value of the capacitor, the waveform of filtered voltage can be adjusted.

In one embodiment, the smart driver comprises: a subtraction circuit, subtracting the source voltage from the drain voltage to output the drain-source voltage; a first comparator, with its non-inverting input receiving the drain-source voltage and its inverting input receiving a first reference voltage; a second comparator, with its inverting input receiving the drain-source voltage and its non-inverting input receiving a second reference voltage; a third comparator, with its inverting input receiving the filtered voltage and its non-inverting input receiving a third reference voltage; a AND gate, with its inputs connected to the output of the second comparator and the third comparator; a flip flop, with its reset input connected to the output of the first comparator, the set input connected to the output of the AND gate; and a driving circuit, with input connected to the output of the flip flop and output to the gate of the rectifier.

In another embodiment, to avoid falsely turning on and turning off the rectifier, the smart driver further comprises a NOT gate, inverting the output of the third comparator and a second AND gate, with its inputs connected to the outputs of the first comparator and the NOT gate; where the flip flop has its reset input connected to the output of the second AND gate.

In another embodiment, the smart driver further comprises: an absolute circuit, with input connected to the output of the differentiation filter circuit and outputting the absolute value of the filtered voltage to the non-inverting input of the third comparator. The absolute value of the third reference voltage is connected to the inverting input of the third comparator.

In one embodiment, the smart driver includes following terminals: a source signal input connected to the source terminal of the rectifier, a drain signal input connected to the drain terminal of the rectifier, a filtered voltage input connected to the output of the differentiation filter circuit, a power input, a ground terminal connected to the source terminal of the rectifier and a driving signal output connected to the gate of the rectifier.

The application of the smart driver for driving the low-side secondary synchronous rectifier of DC-DC flyback power converter is further disclosed as one embodiment of the invention, in which the power input of the smart driver is connected to the output of the power converter.

The application of the smart driver for driving the high-side secondary synchronous rectifier of DC-DC flyback power converter is further disclosed as one embodiment of the invention, in which the converter comprises a powering circuit, supplying power to the smart driver. The powering circuit is a flyback converter, making use of the primary side circuit of the converter and further comprising, a secondary winding, a rectifier diode and a capacitor, with its ground connected to the source terminal of secondary synchronous rectifier and output connected to the power input of the smart driver.

The application of the smart driver for driving the secondary synchronous rectifier and the secondary freewheeling rectifier of the DC-DC forward converter is further disclosed as one embodiment of the invention, in which one smart driver is for driving a secondary synchronous rectifier and another driving a secondary freewheeling rectifier. An additional powering circuit is included in the forward converter, which is a flyback converter, utilizing the primary side circuit of the forward converter, with its ground connected to the source terminal of secondary synchronous rectifier and the ground of the smart driver, output connected to the power input of the smart driver. The output of secondary side circuit of the forward converter supplies power to the smart driver for the secondary freewheeling rectifier.

A smart driving method for avoiding false turning on the rectifier is disclosed, comprising: receiving a drain-source voltage of the rectifier and the differentiation signal thereof, the rectifier is turned on when the drain-source voltage of the rectifier is lower than a second reference voltage and the differentiation signal is lower than a third reference voltage, the rectifier is turned off when the drain-source voltage of the rectifier is higher than a first reference voltage.

To avoid falsely turning off the rectifier further, condition for turning off the rectifier in the method is that the drain-source voltage of the rectifier is higher than a first reference voltage and the differentiation signal is higher than a fourth reference voltage, in which the fourth reference voltage could be equal with the third reference voltage. Said differentiation signal is from the differentiation filter circuit with one capacitor and at least one resistor in series, which can be derived from either between the capacitor and the at least one resistor or between the at least one resistor.

BRIEF DESCRIPTION OF THE DRAWINGS

The accompanying drawings, which are incorporated in and form a part of this specification, illustrate embodiments of the invention and, together with the description serve to explain the principles of the invention.

FIG. 5A and FIG. 5B are two differentiation filter circuit embodiments for the smart driving apparatus.

DETAILED DESCRIPTION

Though the invention will be described with reference to the preferred embodiment thereof, it should be understood that the invention is not limited to said embodiments. On the contrary, it is intended to cover various modifications and substitutions to said invention included within the spirit and scope of the appended claims. To better understand the invention, more specific details will be disclosed for describing embodiments, yet one with ordinary skill in the art should know he can realize said invention departing from said specific details. Well-known materials and methods have not been described in order to avoid obscuring the present invention.

Figure 3:
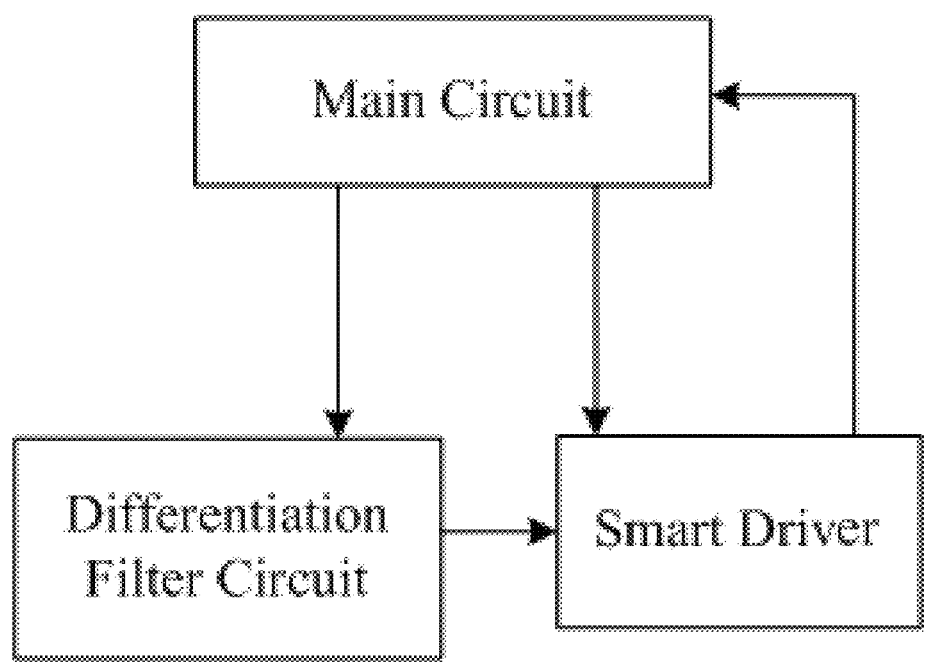
FIG. 3 shows a schematic block diagram illustrating the smart driving apparatus for a synchronous rectifier.

FIG. 3 is a schematic block diagram illustrating a smart driving apparatus for a synchronous rectifier. The smart driving apparatus comprises a main circuit with a synchronous rectifier, a differentiation filter circuit and a smart driver. The voltages on the drain terminal and source terminal of the synchronous rectifier are delivered to the differentiation filter circuit and the smart driver. The smart driver receives the output of the differentiation filter circuit, voltages on the drain and source terminal of the synchronous rectifier, and outputs a driving signal back to control the on/off of said synchronous rectifier. In some other embodiments, the smart driver receives other input signals.

Figure 4:
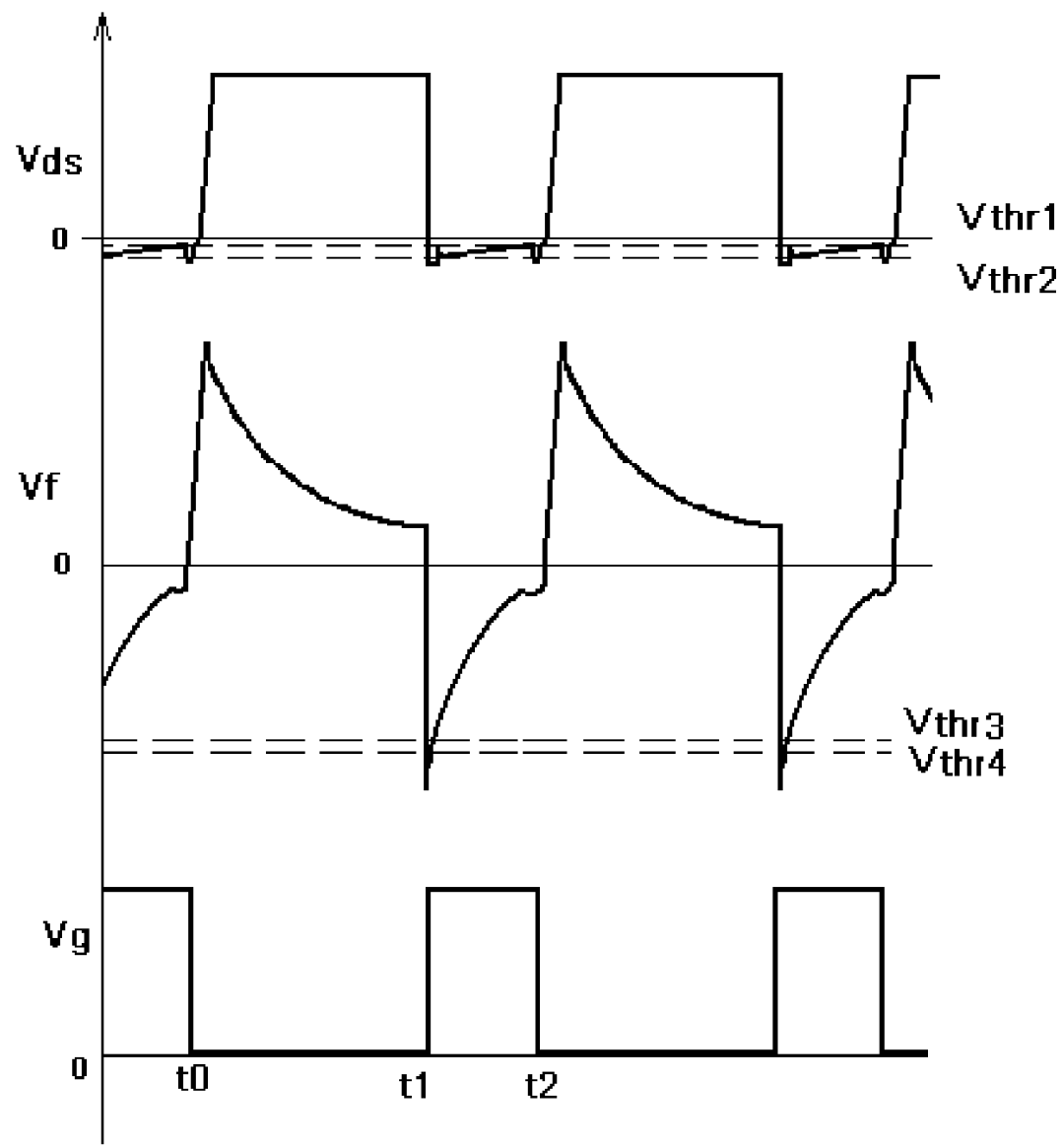
FIG. 4 shows the working waveforms corresponding to the smart driver in FIG. 3.

FIG. 4 illustrates the working principle of the smart driving apparatus in accordance with one embodiment of the present invention. Though the description is based on an NMOSFET as the synchronous rectifier, other types of semiconductor switches can be applied, for example an IGBT.

Figure 1A:
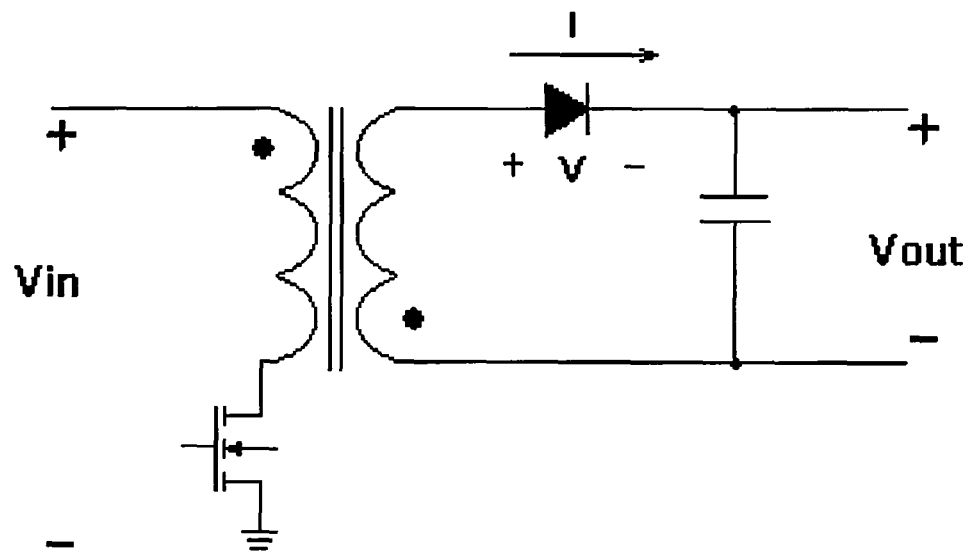
FIG. 1A shows a non-synchronous rectifying scheme applied in the flyback converter.
Figure 1B:
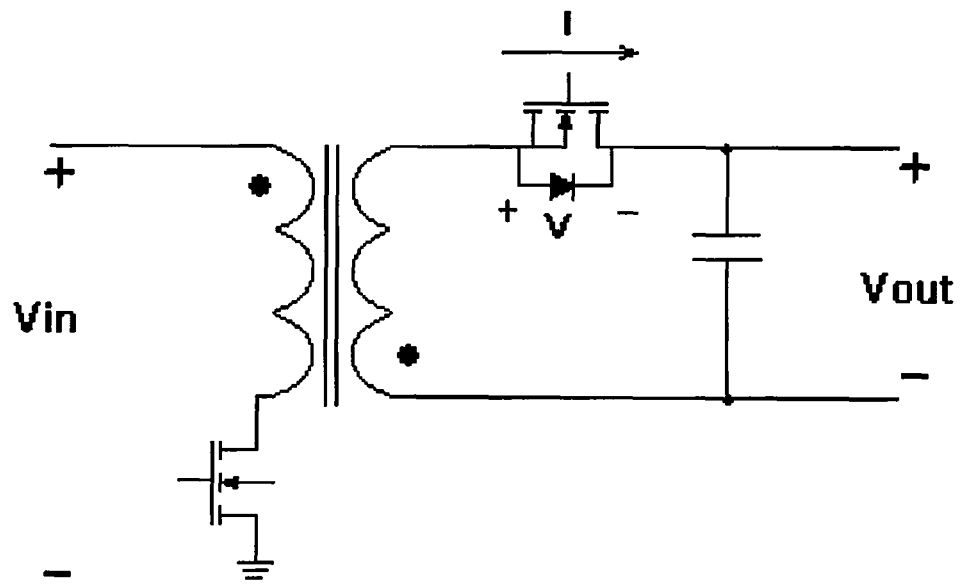
FIG. 1B shows a synchronous rectifying scheme applied in the flyback converter.
Figure 1C:
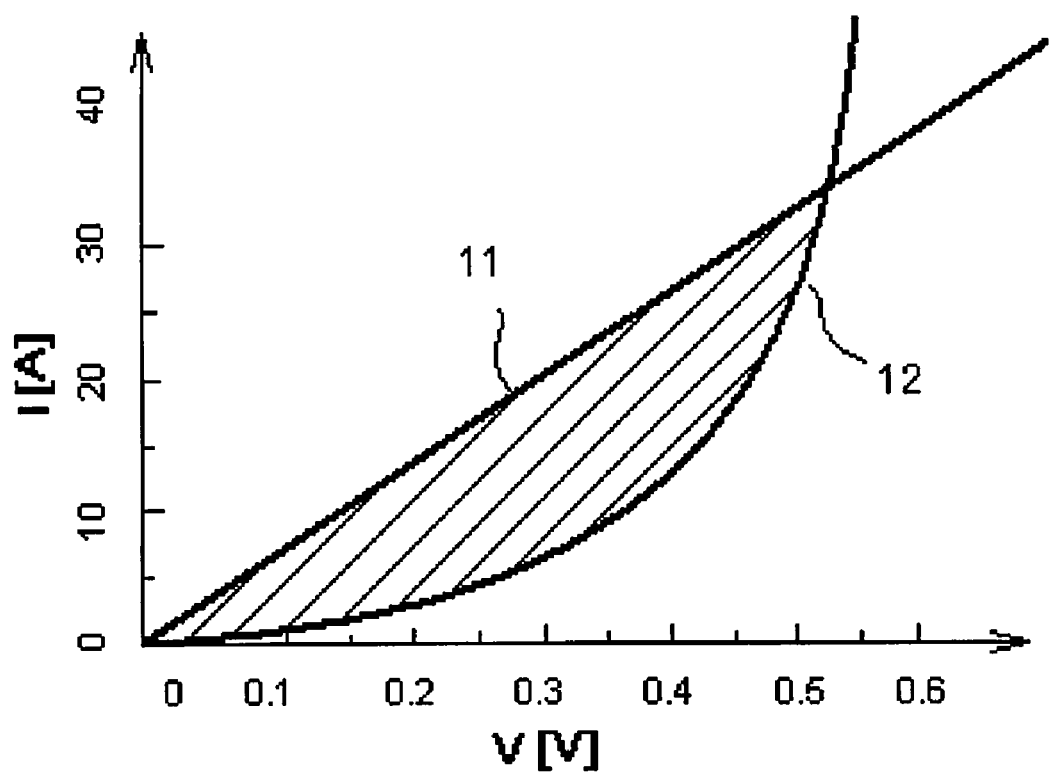
FIG. 1C shows the voltage-current characteristics of a diode (curve 12) and a synchronous rectifier (curve 11).
Figure 2A:
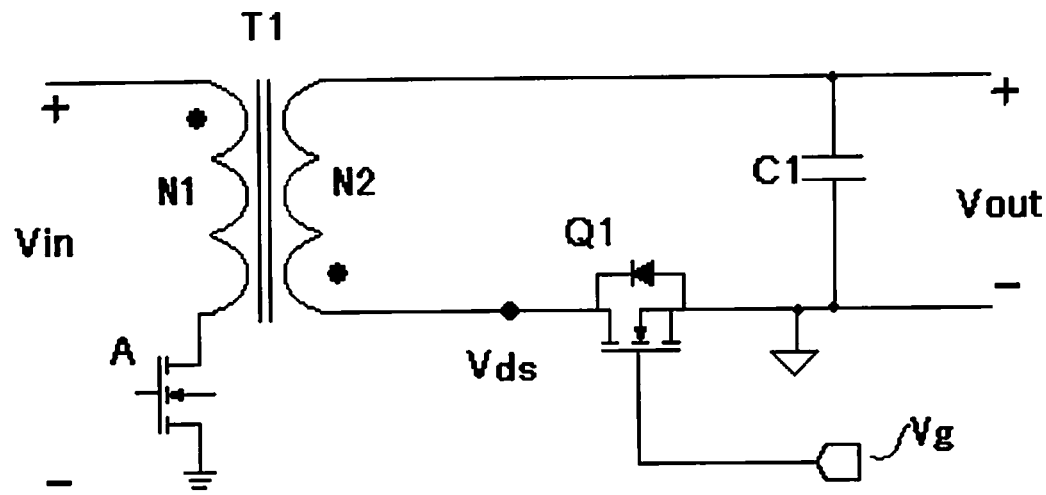
FIG. 2A shows a prior art circuit for driving a secondary synchronous rectifier in the flyback converter.
Figure 2B:
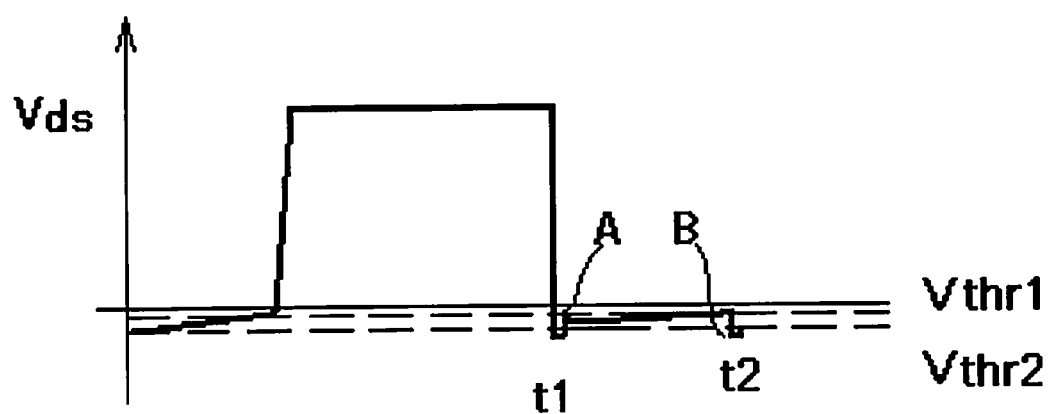
FIG. 2B shows the waveform of Vds in FIG. 2A.

Referring to FIG. 4 and FIG. 2A, to avoid the rectifier being falsely turned on just after the rectifier is normally turned off and avoid the rectifier being falsely turned off just after the rectifier is normally turned on, a differentiation filter circuit is introduced to generate an output voltage Vf to further control on/off of the synchronous rectifier. Vf is a filtered voltage of Vds (drain-source voltage of the synchronous rectifier). The differentiation filter circuit is illustrated in FIG. 5A as one embodiment and FIG. 5B as another embodiment, comprising one capacitor and at least one resistor. In FIG. 5A, the differentiation filter circuit comprises one capacitor C and one resistor R in series, with one terminal of C connected to Vds, the other terminal connected to R and the other terminal of R connected to the ground. In FIG. 5B, the differentiation filter circuit comprises one capacitor C and two resistors of R1 and R2 in series. One terminal of C is connected to Vds, the other terminal is connected to one terminal of R1. One terminal of R2 is connected to another terminal of R1, the other terminal is connected to the ground of the main circuit, and Vf is derived from the point between R1 and R2. For another embodiment of the invention, the terminal of capacitor C at one end is connected to the drain voltage of the synchronous rectifier and the other end of the terminal of R is connected to the source terminal of the synchronous rectifier.

The condition for turning on the rectifier is that Vds is lower than Vthr2 and Vf is lower than Vthr3 and condition for turning off the rectifier is that Vds is higher than Vthr1 and Vf is higher than Vthr4, for which Vthr3 and Vthr4 may be equal. If false turning off the rectifier need not be taken into consideration, the turning off condition will be satisfied with only Vds>Vthr1.

After time t0, switch A in primary side of transformer is turned on and secondary synchronous rectifier is kept off, Vds is given by Vds=(N2/N1)*Vin+Vout, here N1 and N2 standing for the winding turns of the primary and secondary side of T1 respectively, Vout being output voltage of main circuit. At time t=t1, switch A in primary side is turned off, leading to a reversed voltage induced across the secondary side of T1, so energy can be supplied to load through the forward-biased body diode of Q1. The forward-biasing of body diode makes Vds lower to −Vcon, which further decreases Vf, Vcon representing the on-voltage of Q1. When it is satisfied that Vds<Vthr2 and Vf<Vthr3, driving signal Vg is set to high, thus turning on Q1.

After Q1 is turned on, Vds fluctuates rapidly and may rises to higher than Vthr1. because Vf is still lower than Vthr4 under the condition, false turning off Q1 can be avoided. After Q1 is turned on, Vds changes in accordance with expression Vds=−Rdson*I. With the secondary current I decaying, Vds rises gradually. At time t=t2, it is satisfied that Vds>Vthr1 and Vf>Vthr4, driving signal Vg is set to low, thus turning off Q1. After Q1 is turned off, residual current may flow through body diode of Q1 again, making Vds<Vthr2, for Vf is still higher than Vthr3, false turning on Q1 can be avoided.

To turn on Q1, it is required that Vds must be lower than Vthr2, so value of Vthr2 should be set slightly higher than −Vcon, yet lower than −Rdson*I. Vthr1 should be higher than Vthr2, better conversion efficiency and reliability can be achieved through setting Vthr1 to an appropriate value. Q1 will be turned off too early if Vthr1 is set too low, so interval during which the current flowing through body diode of Q1 will become longer, with a consequence of more power wasted and efficiency decreased for the relative higher voltage drop across Q1's body diode. Q1 will be turned off too late if Vthr1 is set too high, and there may be a period of time during which Q1 and switch A are both on, thus affecting the output stability and even damaging Q1 for the inverse flow of current through Q1. In order to make it applicable in all situations from DCM to CCM, an appropriate value of Vthr1 should be set with the load taken into consideration. Vthr3 should be slightly higher than Vf filtered from Vds at the time t=t1 when Vds drops quickly. The setting of Vthr4 should make it satisfied that when Vf is higher than Vthr4, voltage fluctuation just after Q1 is normally opened has disappeared or Vds caused by the fluctuation is lower than Vthr1.

Figure 6A:
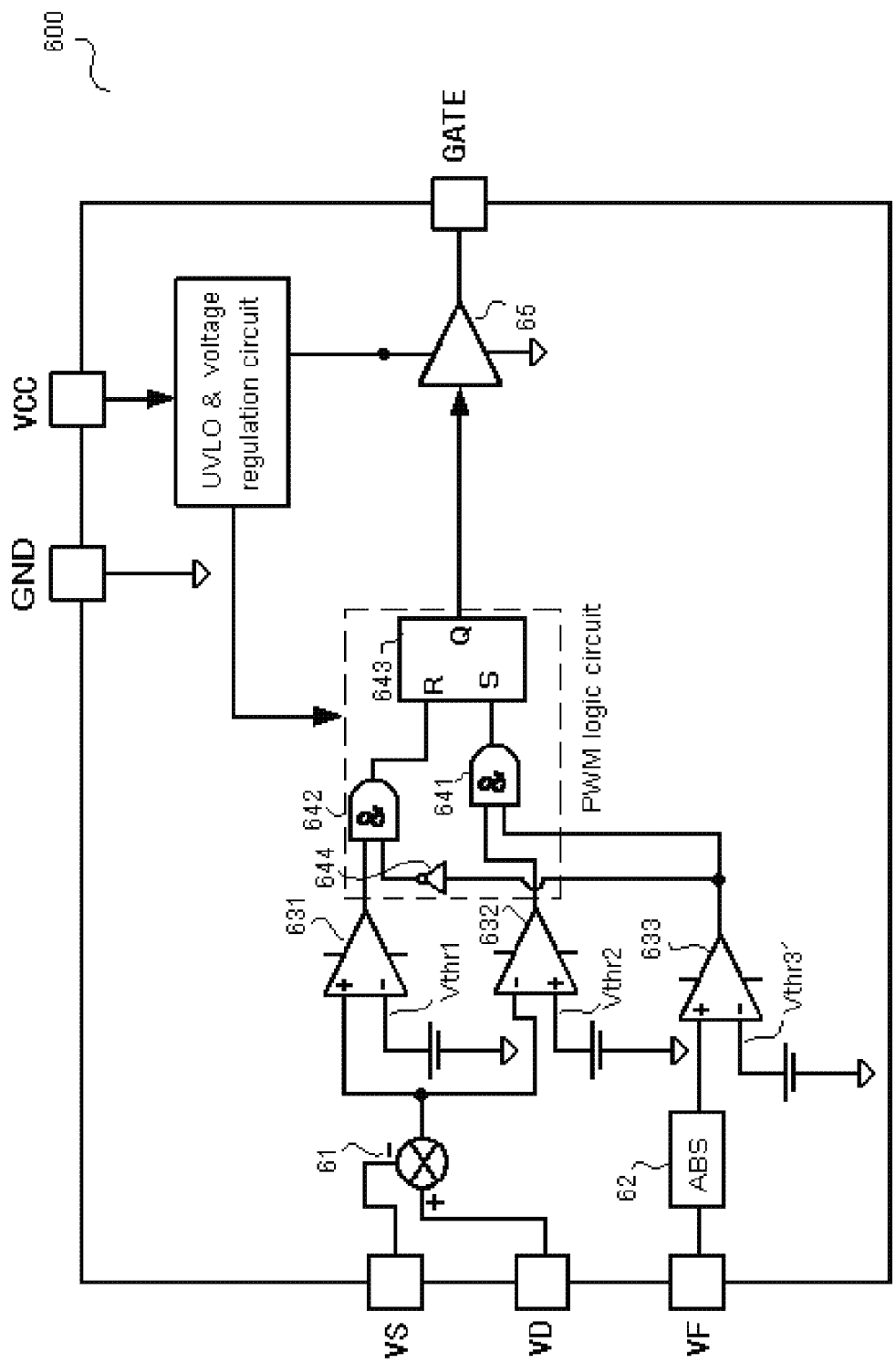
FIG. 6A shows a schematic diagram disclosing the detailed structure of the smart driver.

FIG. 6A is an exemplary schematic diagram of a smart driver which is used for driving synchronous rectifier and also for realizing the control method in accordance with one embodiment of the present invention. To be simple, Vthr3 and Vthr4 could be equal in one embodiment, so only three comparators are enough to fulfill the smart driving in accordance with one embodiment. Thus condition for turning off Q1 is that Vds is higher than Vthr1 and Vf is higher than Vthr3 and condition for turning on Q1 is that Vds is lower than Vthr2 and Vf is lower than Vthr3. The smart driver comprises following terminals, terminal VS connected to the source terminal of Q1, terminal VD connected to the drain terminal of Q1, terminal VF connected to the output of differentiation filter circuit, terminal VCC as power input, terminal GATE is connected to the gate of Q1 to drive Q1 and terminal GND is also connected to the source terminal of Q1. Sampling precision of terminal VS is generally higher than that of terminal GND.

The smart driver 600 in FIG. 6A comprises: a subtraction circuit 61, an absolute circuit 62, a first comparator 631, a second comparator 632, a third comparator 633, a PWM logic circuit, a driving circuit 65, and an UVLO and voltage regulation circuit. Said subtraction circuit 61 subtracts voltage on terminal VS from that on terminal VD, outputting Vds to the non-inverting terminal of comparator 631 and to the inverting terminal of comparator 632. To avoid the problem that a comparator can't work normally with a great negative value input, an absolute circuit 62 is arranged between terminal VF and comparator 633 in one embodiment, the absolute value of terminal VF is inputted to the non-inverting terminal of comparator 633. Vthr1 is connected to the inverting terminal of comparator 631, Vthr2 is connected to the non-inverting terminal of comparator 632 and Vthr3' is connected to the inverting terminal of comparator 633 where Vthr3' is the absolute value of Vthr3. In another embodiment of the invention, the absolute circuit is not included. VF is directly connected to the inverting terminal of comparator 633 and Vthr3 is connected to the non-inverting terminal of comparator 633. Said PWM logic circuit receives output from comparator 631, 632 and 633, comprising: a first AND gate 641, a second AND gate 642, a NOT gate 644 and a flip flop 643. The outputs of comparator 632 and comparator 633 are connected to the inputs of AND gate 641, which generates an output signal to the SET terminal of flip flop 643. The output of comparator 633 is also connected to the input of NOT gate 644, which outputs to one input of AND gate 642, the other input of AND gate 642 is connected to the output of comparator 631. AND gate 642 outputs to the RESET terminal of flip flop 643. When Vds falls lower than Vthr2 and Vf lower than Vthr3 or |Vf| higher than Vthr3', the output of AND gate 641 is turned to high, which sets flip flop 643 high, thus turning on the synchronous rectifier. When Vds rises higher than Vthr1 and Vf higher than Vthr3 or |Vf| lower than Vthr3', the output of AND gate 642 is turned to high, which resets flip flop 643 low, thus turning off the synchronous rectifier. Here Vthr3' is equal to |Vthr3|. In another embodiment of the invention, in which the possibility is ignored that rectifier may be again falsely turned off by voltage vibration just after it is normally turned on, AND gate 642 and NOT gate 644 are not included in the PWM logic circuit, thus the output of comparator 631 is directly connected to the RESET terminal of flip flop 643. In yet another embodiment of the invention with no subtraction circuit, terminal VD is directly connected to the non-inverting terminal of comparator 631 and inverting terminal of comparator 632. The smart driver 600 can further comprises an UVLO and voltage regulation circuit connected to terminal VCC, supplying power to the smart driver 600 and protecting the smart driver 600 from working on low voltage condition. The smart driver 600 can further comprise a driving circuit 65, with its input connected to the output of the flip flop 643, and its output connected to terminal GATE, which outputs signal Vg to the gate of the synchronous rectifier.

Figure 7:
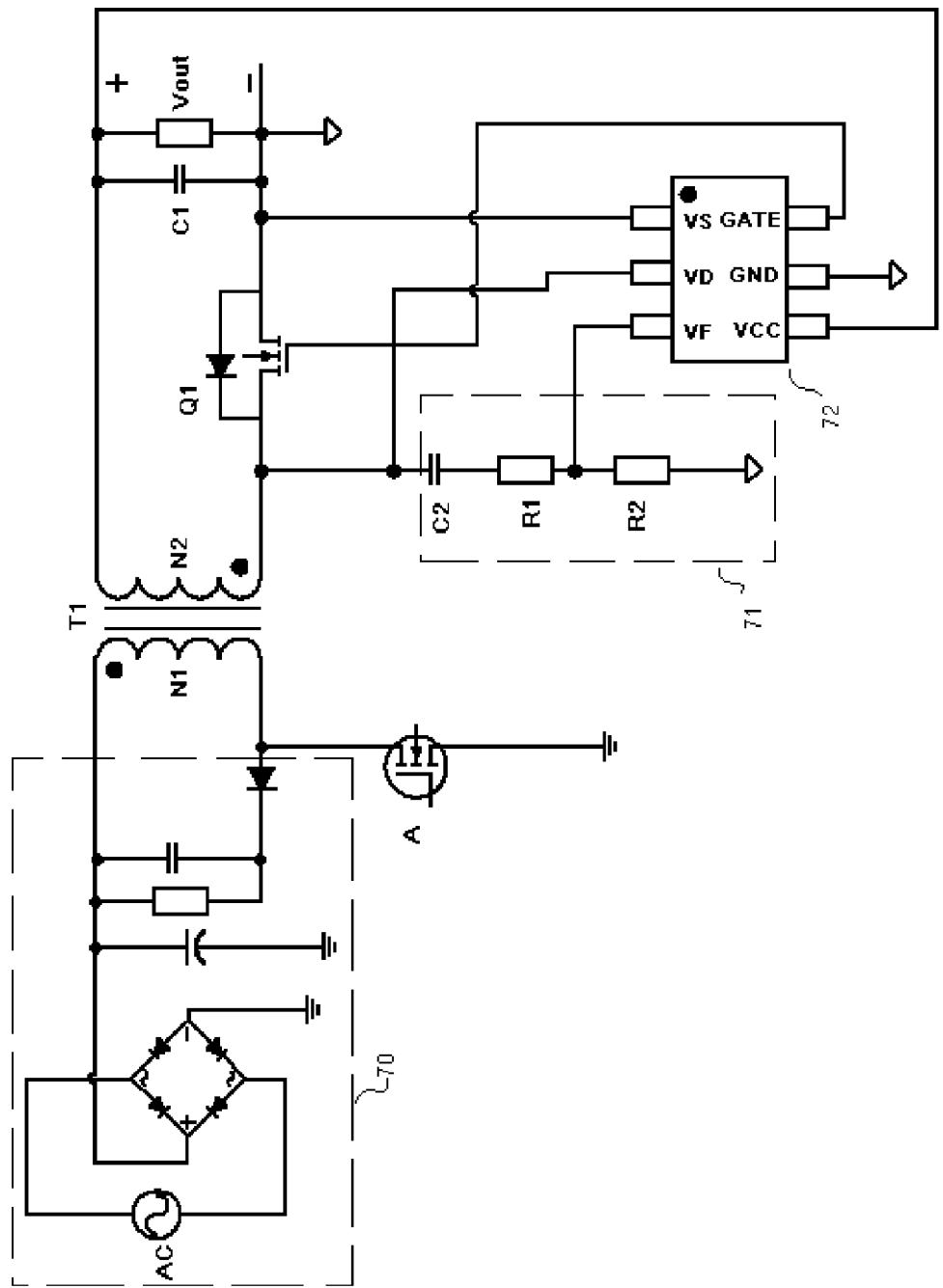
FIG. 7 shows a schematic diagram illustrating the application of the smart driver for the low side secondary synchronous rectifier in a flyback converter.

FIG. 7 is one embodiment of application of the smart driver for the secondary synchronous rectifier on the low side of a flyback converter. The flyback converter in the embodiment comprises: an input circuit 70, a switch A, a transformer T1, a synchronous rectifier Q1, a capacitor C1, a differentiation filter circuit 71, a smart driver 72 and an output terminal Vout. A DC voltage, output by the input circuit 70, is applied on the primary winding of T1 through the switching of switch A, a relevant AC voltage is present on the secondary side of T1 and is further converted into a DC voltage through the rectifying function of Q1 and filtering function of C1, powering the load with DC voltage. In some embodiment, the load can be portable computer, wireless communication device, LCD or Ethernet device. In one embodiment, one terminal of Q1 is connected to the ground with another terminal connected to the secondary winding N2 of T1, though the embodiment is based on an NMOSFET as Q1, other types of semiconductor switch are also applicable.

To realize the smart driving of Q1, the differentiation filter circuit 71 and the smart driver 72 are utilized in the embodiment. Said differentiation filter circuit 71 comprises a capacitor C2, a resistor R1 and a resistor R2. The internal structure of the smart driver 72 is as what has been described above.

To only avoid Q1 being falsely turned on, the smart driver comprises in one embodiment: a first comparator with its non-inverting terminal connected to VD and inverting terminal connected to Vthr1; a second comparator with its inverting terminal connected to VD and non-inverting terminal connected to Vthr2; a third comparator with its inverting terminal connected to VF and non-inverting terminal connected to Vthr3; a PWM logic circuit, comprising: a first AND gate, receiving the outputs of the second comparator and the third comparator; and a flip flop, with the RESET terminal connected to the output of the first comparator, the SET terminal connected to the output of the first AND gate; a driving circuit, receiving the output of the flip flop and driving the gate of the Q1; and an ULVO circuit.

Figure 6B:
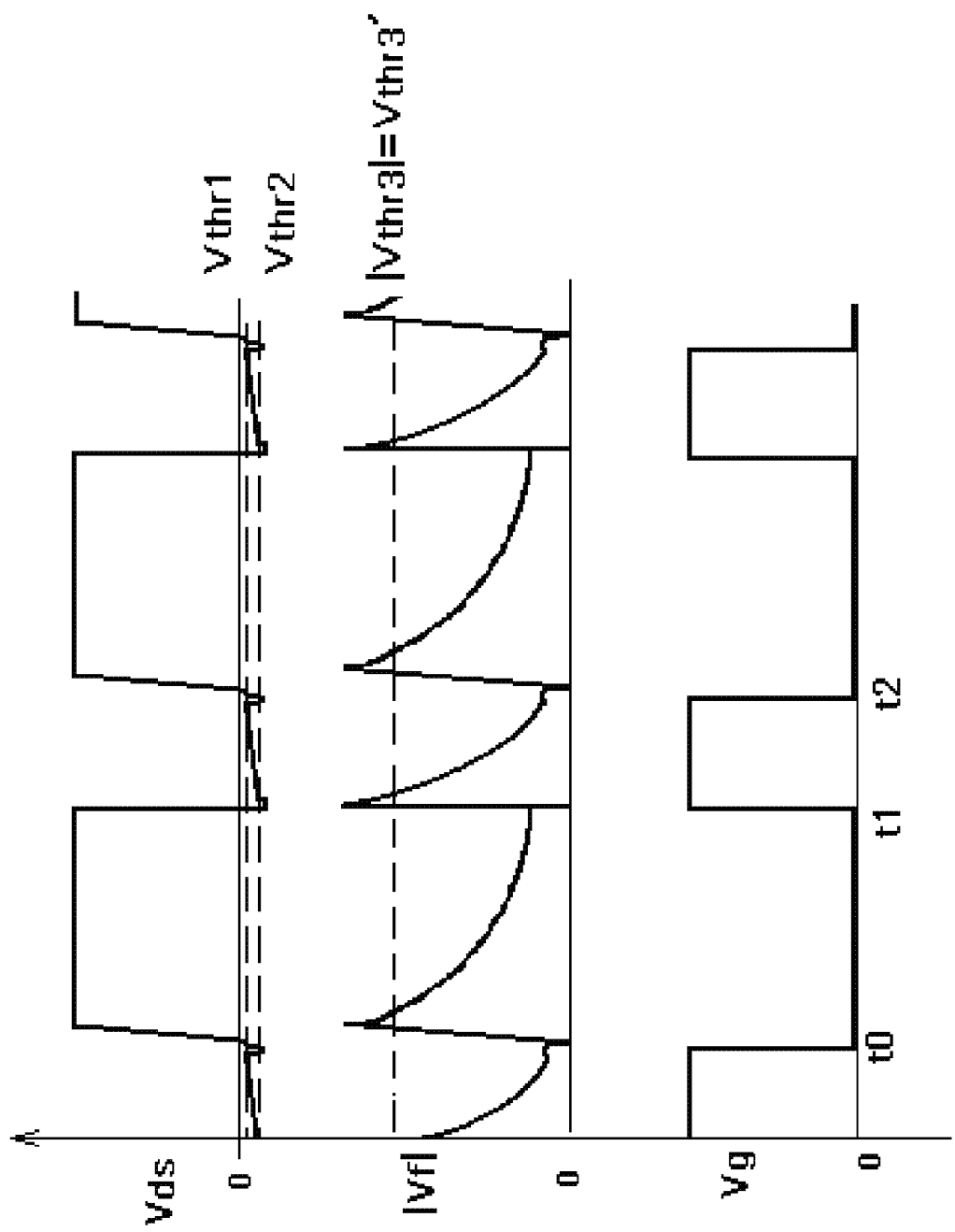
FIG. 6B shows the working waveforms corresponding to FIG. 4 with absolute value of the filtered voltage.

To avoid Q1 being falsely turned off and being falsely turned on, the smart driver comprises in one embodiment: a first comparator with its non-inverting terminal connected to VD and inverting terminal connected to Vthr1; a second comparator with its inverting terminal connected to VD and non-inverting terminal connected to Vthr2; a third comparator with its inverting terminal connected to VF and non-inverting terminal connected to Vthr3; a PWM logic circuit comprising: a first AND gate, a NOT gate, a second AND gate and a flip flop, where the first AND gate with its inputs connected to the outputs of the second comparator and the third comparator, the NOT gate inverting the output of the third comparator, a second AND gate with its inputs connected to the outputs of the first comparator and the NOT gate, the flip flop with its reset input connected to the output of the second comparator, the set input connected to the output of the first comparator; a driving circuit, with its input connected to the output of the flip flop and the output to the gate of the rectifier; and an UVLO circuit. The terminal VF of the smart driver receives the filtered voltage of Vds which is differentiated by the circuit 71, terminal VS is connected to the source terminal of Q1, terminal VD is connected to the drain terminal of Q1, terminal VCC is connected to Vout, terminal GND is connected to the ground of secondary circuit and terminal GATE drives Q1. Said embodiment described in FIG. 7 can be used as an example corresponding to the waveform shown in FIG. 4 or FIG. 6B.

Figure 8:
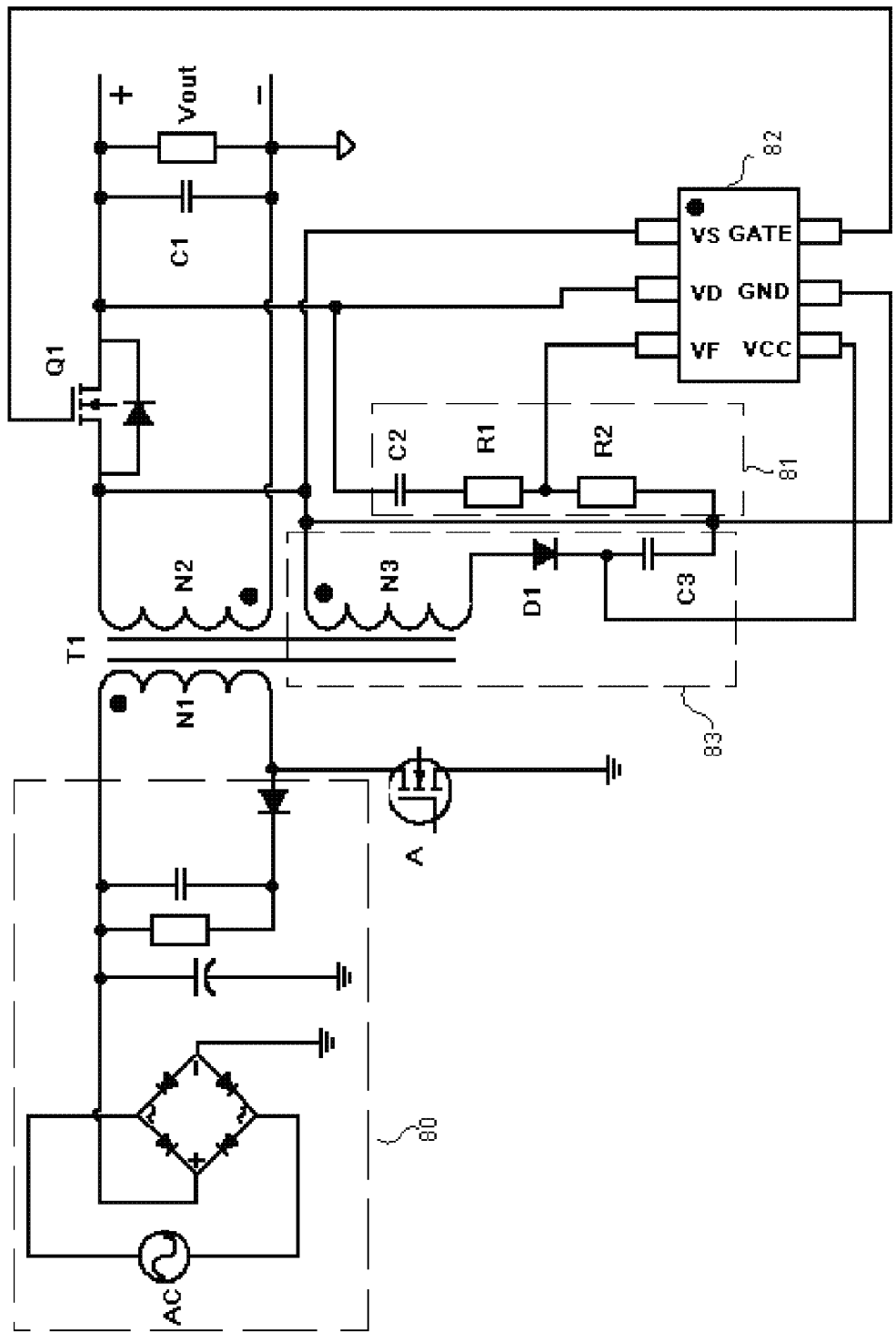
FIG. 8 shows a schematic diagram illustrating the application of the smart driver for the high side secondary synchronous rectifier in a flyback converter.

FIG. 8 is another embodiment of application of the smart driver where the secondary synchronous rectifier is on the high side of a flyback converter. In the embodiment, Q1 is connected between the positive pole of Vout and the secondary winding N2. Waveform of Vds in the embodiment is the same as that in the previous embodiment illustrated in FIG. 7, so the same driving method can be applied. The flyback converter in the embodiment comprises: an input circuit 80, a switch A, a transformer T1, a synchronous rectifier Q1, a capacitor C1, a differentiation filter circuit 81, a smart driver 82 and the output terminal Vout. Though the embodiment is based on an NMOSFET as Q1, other types of semiconductor switch are also applicable.

The transformer T1 comprises a primary winding N1, a secondary winding N2 and a secondary winding N3, in which N2 is used for providing regulated voltage of the flyback converter and N3 for powering the smart driver 82. In order to filter Vds, one end of R2 in the filter circuit 81 is connected to the source terminal of Q1 and the source terminal of Q1 is also connected to terminal GND of the smart driver 82. For powering circuit 82, an additional powering circuit 83 is arranged, which comprises a the winding N3, a diode D1 and a capacitor C3. the anode of D1 is connected to N3 and cathode of D1 connected to one end of C3, and the other end of C3 is connected to source terminal of Q1. Circuit 83 powers circuit 82 through terminal VCC of circuit 82. Voltage on terminal VCC is higher than that on terminal GND.

To realize the smart driving of Q1, a differentiation filter circuit 81 and a smart driver 82 as illustrated above are disposed here. Circuit 81 comprises a capacitor C2, a resistor R1 and a resistor R2. For circuit 82, terminal VF receives filtered voltage of Vds differentiated by circuit 81, terminal VD is connected to the drain terminal of Q1, terminal VS is connected to the source terminal of Q1, terminal VCC receives the output from powering circuit 83, terminal GND is connected to the source terminal of Q1 and terminal GATE is connected to the gate of Q1. For circuit 81, one end of C2 is connected to the drain terminal of Q1 and at the other end, R2 is connected to the source terminal of Q1, thus a voltage of Vds is applied to circuit 81 and a filtered voltage is output to circuit 82 through terminal VF thereof. Said embodiment described in FIG. 8 can be used as an example corresponding to the waveform shown in FIG. 4 or FIG. 6B.

Figure 9:
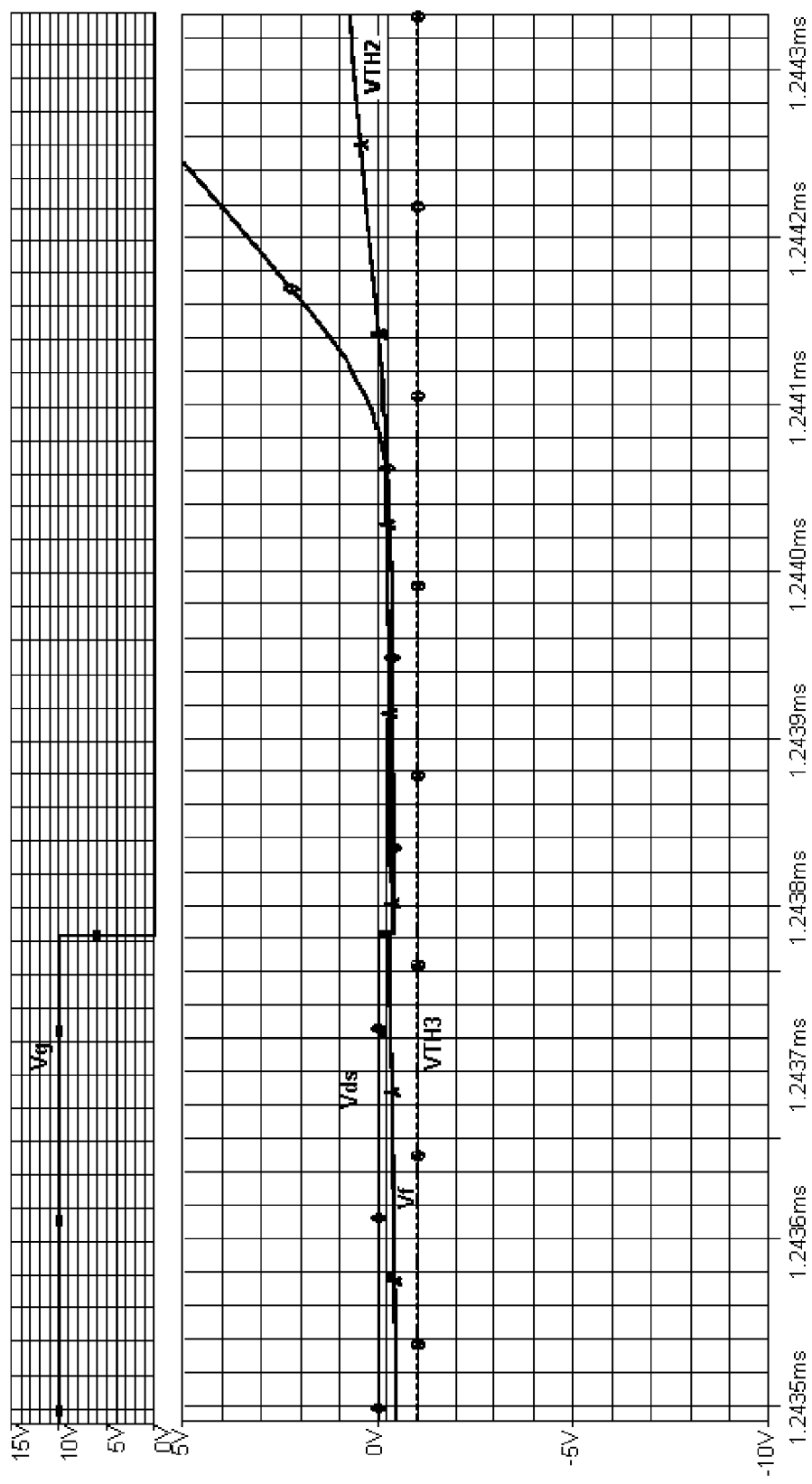
FIG. 9 is the simulation waveform based on the embodiment illustrated in FIG. 7.

FIG. 9 shows the simulation waveform based on the embodiment illustrated in FIG. 7. During the interval from the time Q1 is turned off to the time switch A is turned on, driving signal Vg never changes to high as illustrated in FIG. 2C, which would make Q1 be turned on falsely.

Figure 10:
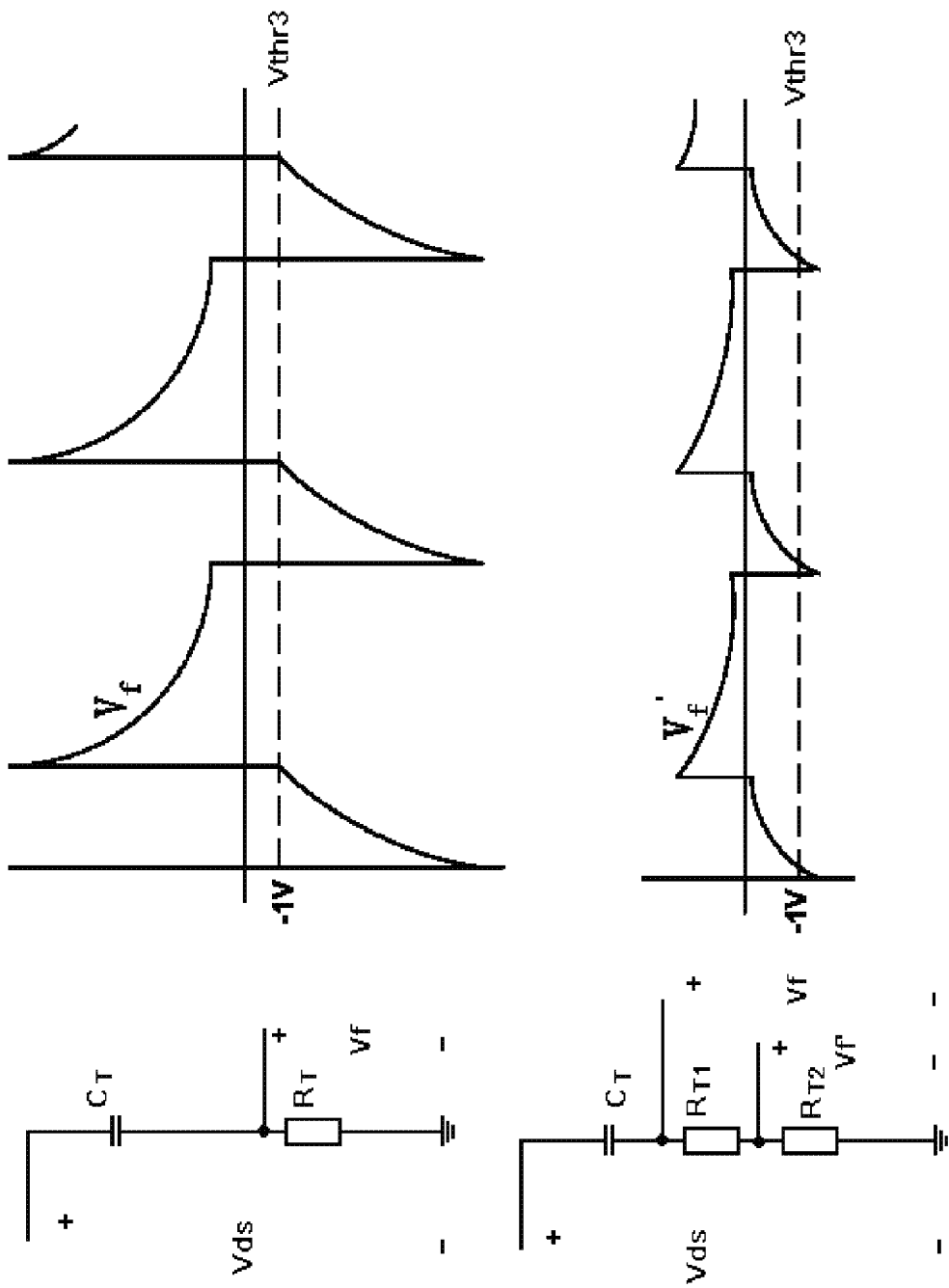
FIG. 10 shows two exemplary structures of the differentiation filter circuit and their respective waveforms, illustrating the adjustability of the trigger point.

FIG. 10 illustrates the method for adjusting the trigger point as one embodiment. Vthr3 is set to be −1V as an example. One embodiment of differentiation filter circuit shown in the upper left area of FIG. 10 comprises a capacitor CT and a resistor RT, Vf is derived from the point between CT and RT and its waveform is shown in the upper right area of FIG. 10. Another embodiment of differentiation filter circuit shown in the down left area of FIG. 10 comprises a capacitor CT, a resistor RT1 and a resistor RT2. And Vf is derived from the point between RT1 and RT2 and its waveform is shown in the down right area of FIG. 10. For the waveform in the upper right area of FIG. 10, when Q1 is turned off normally, Vf is still lower than Vthr3, thus turning on Q1 falsely. Though when the differentiation filter circuit as in the down side is applied, Vf can be kept higher than Vthr3 when Q1 is turned off normally, which is illustrated in the down right area of FIG. 10. Thus, by selecting the filtered voltage from the node between the capacitor CT and resistor RT or between the resistors of RT1 and RT2, the proper trigger point can be selected and false triggering can be avoided. Besides, by adjusting the value of RT1, RT2, or CT, the trigger point also can be adjusted.

The smart driving method illustrated above is applicable not only in flyback converter but also in other converters such as forward converter. It can be used for driving the synchronous rectifier Q2 and freewheeling rectifier Q3 for forward converter illustrated in FIG. 11. The forward converter comprises: an input circuit 100, a switch A, a diode D0, a transformer T1, a secondary synchronous rectifier Q2, a freewheeling rectifier Q3, an inductor L1, a capacitor C1, a first filter circuit 1011 for Q2, a second filter circuit 1012 for Q3, a first smart driver 1021 for Q2, a second smart driver 1022 for Q3, a powering circuit 103 for the first smart driver 1021. The transformer T1 comprises a primary winding N1, a secondary winding N2, a winding N0 for demagnetization and a winding N3 for supplying power to the first smart driver 1021.

Figure 11:
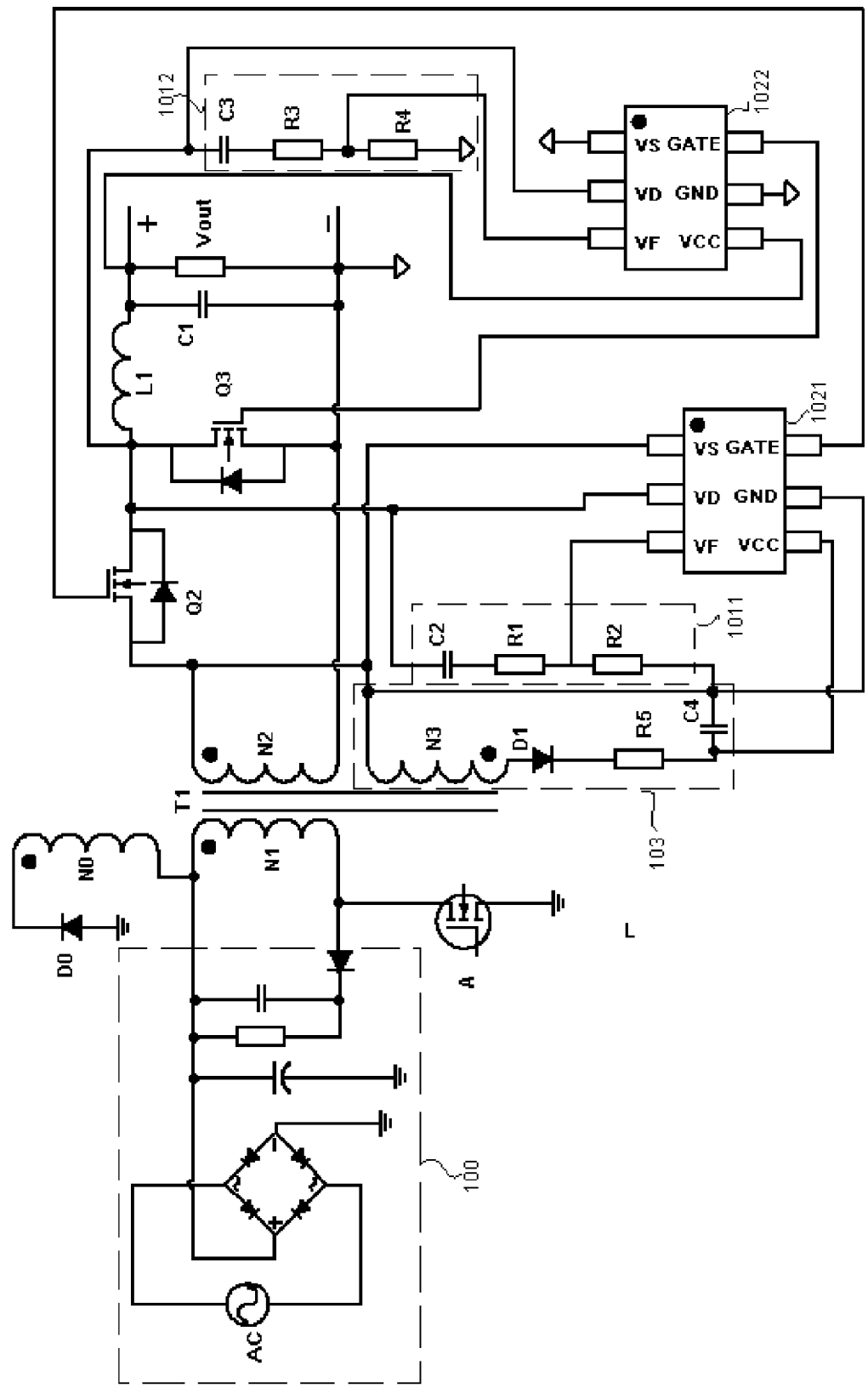
FIG. 11 is a schematic diagram illustrating application of two smart drivers in a forward converter, one for a secondary synchronous rectifier and another for a freewheeling rectifier.

Continuing with FIG. 11, when switch A is turned on, body diode of Q2 will be conduct current accordingly, followed by Q2 being turned on by the first smart driver 1021 and the drain-source voltage of Q3 can be given as Vds=(N2/N1)*Vin, Vin is the output voltage of circuit 100. If switch A is turned off, Q2 will be turned off by circuit 1021 accordingly and body diode of Q3 will conduct current, followed by Q3 being turned on by circuit 1022 and the drain-source voltage of Q2 can be given as Vds=(N2/N0)*Vin. The circuit 103 supplies power to circuit 1021, sharing the primary circuit with the forward converter, with its secondary circuit comprising: a winding N3, a diode D1, a resistor R5 and a capacitor C4. N3 is connected to the anode of D1, the cathode of D1 is connected to one end of R5, the other end of R5 is connected to C4 and to terminal VCC of circuit 1021, and the other end of C4 is connected to the source terminal of Q2.

In some embodiments, the smart driver further comprises the circuits for providing the reference voltage Vthr1, Vthr2 and Vthr3. Filter circuit can be in other form and outputs an equivalent waveform to the filtered voltage as described above and reaches the same object, based on sampling the drain-source voltage of the synchronous rectifier.

Though the invention is described with reference to the preferred embodiment thereof, it should be understood that the invention is not limited to the embodiments. On the contrary, it is intended to cover various modifications and substitutions to the invention included within the spirit and scope of the appended claims.

We claim:

1. An apparatus, comprising: a main circuit having a synchronous rectifier; a differentiation filter circuit receiving a drain voltage and a source voltage of said synchronous rectifier, the differentiation filter circuit filtering a drain-source voltage of said synchronous rectifier and putting out a filtered voltage;
  a smart driver, receiving said drain voltage, said source voltage and said filtered voltage and outputting a driving signal to the gate of said synchronous rectifier;
  wherein turn-on of said synchronous rectifier is triggered when said drain-source voltage is lower than a second reference voltage and said filtered voltage is lower than a third reference voltage, and turn-off of said synchronous rectifier is triggered when said drain-source voltage is higher than a first reference voltage.

2. The apparatus in claim 1, wherein turn-off of said synchronous rectifier is triggered when said drain-source voltage is higher than a first reference voltage and said filtered voltage is higher than a fourth reference voltage.

3. The apparatus in claim 2, wherein said third reference voltage equals said fourth reference voltage.

4. The apparatus in claim 1, wherein said differentiation filter circuit comprises a capacitor and at least one resistor connected in series, and one end of said capacitor is connected to the drain of said synchronous rectifier, the other end of said capacitor is connected to said at least one resistor; the other end of said at least one resistor is connected to the source of said synchronous rectifier; said filtered voltage is from either between said capacitor and said at least one resistor or between said at least one resistor.

5. The apparatus in claim 4, wherein said at least one resistor and said capacitor are adjustable to adjust the trigger point of said smart driver.

6. The apparatus in claim 1, wherein said smart driver comprises: a subtractor, subtracting said source voltage from said drain voltage to output a drain-source voltage; a first comparator, with its non-inverting input receiving said drain-source voltage, its inverting input receiving said first reference voltage; a second comparator, with its inverting input receiving said drain-source voltage, its non-inverting input receiving said second reference voltage; a third comparator, with its inverting input receiving said filtered voltage, with its non-inverting input receiving said third reference voltage; a PWM logic circuit, comprising: an AND gate with its inputs connected to the outputs of said second comparator and said third comparator; and a flip flop with its reset input connected to the output of said first comparator, the set input connected to the output of said AND gate; a driving circuit with its input terminal connected to the output of said flip flop, its output terminal connected to gate of said synchronous rectifier.

7. The apparatus in claim 3, wherein said smart driver comprises:
  a subtractor, subtracting said source voltage from said drain voltage to output a drain-source voltage;
  a first comparator, with its non-inverting input receiving said drain-source voltage, its inverting input receiving said first reference voltage;
  a second comparator, with its inverting input receiving said drain-source voltage, its non-inverting input receiving said second reference voltage;
  a third comparator, with its inverting input receiving said filtered voltage, with its non-inverting input receiving said third reference voltage;
  a PWM logic circuit, comprising:
    a first AND gate, with its inputs connected to the outputs of said second comparator and said third comparator;
    a NOT gate, inverting the output of said third comparator;
    a second AND gate, with its inputs connected to the outputs of said first comparator and said NOT gate;

a flip flop, with its reset input connected to the output of said second AND gate, and its set input connected to the output of said first AND gate and putting out said driving signal;

a driving circuit with its input terminal connected to the output of said flip flop, its output terminal connected to the gate of said synchronous rectifier.

8. The apparatus in claim 6, wherein said smart driver further comprises an absolute circuit, putting out an absolute value of said filtered voltage, and delivering to the non-inverting input of said third comparator, whereas the inverting input of said third comparator receiving an absolute value of said third reference voltage.

9. The apparatus in claim 6 wherein said smart driver further comprises an UVLO and voltage regulation circuit to offer energy to said smart driver.

10. The apparatus in claim 1, wherein said smart driver has following external terminals: a source voltage input, connected to the source of said synchronous rectifier; a drain voltage input, connected to the drain of said synchronous rectifier; a filtered voltage input, connected to the output of said differentiation filter circuit; a power input, receiving input power; a ground pin; and an output, putting out said driving signal.

11. The apparatus in claim 10, wherein the ground terminal of said smart driver is connected to source terminal of said synchronous rectifier.

12. The apparatus in claim 11, wherein said synchronous rectifier lies on low side of secondary circuit of a flyback converter.

13. The apparatus in claim 12, wherein said power input of said smart driver is connected to the output of said flyback converter.

14. The apparatus in claim 1, wherein said smart driver comprises: a first comparator, with its non-inverting input receiving said drain voltage, its inverting input receiving said first reference voltage; a second comparator, with its inverting input receiving said drain voltage, its non-inverting input receiving said second reference voltage; a third comparator, with its inverting input receiving said filtered voltage, with its non-inverting input receiving said third reference voltage; a PWM logic circuit, comprising: an AND gate with its inputs connected to the outputs of said second comparator and said third comparator; and an flip flop with its reset input connected to the output of said first comparator, the set input connected to the output of said AND gate and putting out said driving signal; a driving circuit with its input terminal connected to the output of said flip flop, its output terminal connected to the gate of said synchronous rectifier.

15. The apparatus in claim 2, wherein said smart driver comprises:
a first comparator, with its non-inverting input receiving said drain voltage, its inverting input receiving said first reference voltage;
a second comparator, with its inverting input receiving said drain voltage, its non-inverting input receiving said second reference voltage;
a third comparator, with its inverting input receiving said filtered voltage, with its non-inverting input receiving said third reference voltage;
a PWM logic circuit, comprising:
a first AND gate, with its inputs connected to the outputs of said second comparator and said third comparator;
a NOT gate, inverting the output of said third comparator;
a second AND gate, with its inputs connected to the outputs of said first comparator and said NOT gate;

a flip flop, with its reset input connected to the output of said second AND gate, and its set input connected to the output of said first AND gate and putting out said driving signal;

a driving circuit with its input terminal connected to the output of said flip flop, its output terminal connected to the gate of said synchronous rectifier.

16. The apparatus in claim 11, wherein said synchronous rectifier lies on high side of secondary circuit of a flyback converter.

17. The apparatus in claim 16, further comprises a powering circuit for supplying power to said smart driver, wherein said powering circuit is a second flyback converter making use of the primary side circuit of said flyback converter and further comprises a secondary winding, a rectifier diode and a capacitor, with the secondary winding connected to the anode of said diode and the cathode of said diode connected to one end of said capacitor and the power input of said smart driver, another end of said capacitor is connected to the source terminal of said synchronous rectifier.

18. The apparatus in claim 1, wherein said main circuit is a DC-DC forward converter, comprising a secondary synchronous rectifier and a freewheeling rectifier, a first smart driver for driving said secondary synchronous rectifier and a second smart driver for driving said freewheeling rectifier.

19. The apparatus in claim 18, further comprising a powering circuit supplying power to said first smart driver, with the ground of said first smart driver connected to the source terminal of said secondary synchronous rectifier and the power input of said first smart driver connected to the power output of said powering circuit; the ground and the power input of said second smart driver are connected to the ground and the power output of secondary circuit of said forward converter respectively.

20. The apparatus in claim 19, wherein said powering circuit is a flyback converter, sharing the primary circuit with said forward converter, with its secondary circuit comprising:
a winding, a diode, a resistor, a capacitor, with said winding connected to the anode of said diode, the cathode of said diode connected to one end of said resistor, the other end of said resistor connected to said capacitor and to the power input of said first smart driver, the other end of said capacitor connected to the source terminal of said secondary synchronous rectifier.

21. A method for driving a synchronous rectifier, comprising:
receiving a drain-source voltage of said synchronous rectifier and a differentiation signal thereof;
when said drain-source voltage of said synchronous rectifier is lower than a second reference voltage and said differentiation signal is lower than a third reference voltage, turning on said synchronous rectifier;
when said drain-source voltage of said rectifier is higher than a first reference voltage, turning off said synchronous rectifier.

22. The method for driving a synchronous rectifier in claim 21, wherein when said drain-source voltage of said synchronous rectifier is higher than a first reference voltage and said differentiation signal is higher than a fourth reference voltage, turning off said synchronous rectifier.

23. The method for driving a synchronous rectifier in claim 22, wherein said third reference voltage equals said fourth reference voltage.

24. The method for driving a synchronous rectifier in claim 21, wherein said differentiation signal is from a differentiation filter circuit with one capacitor and at least one resistor in series, with said differentiation signal derived from between said capacitor and said at least one resistor.

25. The method for driving a synchronous rectifier in claim 21, wherein said differentiation signal is from a differentiation filter circuit comprising a capacitor, a first resistor and a second resistor in series, and wherein said differentiation signal is derived from between said first resistor and said second resistor.

* * * * *